United States Patent
Miller

(10) Patent No.: US 8,840,390 B2
(45) Date of Patent: Sep. 23, 2014

(54) MACHINE FOR THE PRODUCTION OF FORMED PATTIES WITH A HAND MADE APPEARANCE, AND METHOD FOR INTERLEAVING PAPER AND STACKING

(75) Inventor: Alan G. Miller, South Easton, MA (US)

(73) Assignee: Risco USA Corporation, South Easton, MA (US)

( * ) Notice: Subject to any disclaimer, the term of this patent is extended or adjusted under 35 U.S.C. 154(b) by 796 days.

(21) Appl. No.: 12/147,775

(22) Filed: Jun. 27, 2008

(65) Prior Publication Data

US 2009/0087530 A1   Apr. 2, 2009

Related U.S. Application Data

(60) Provisional application No. 60/947,286, filed on Jun. 29, 2007.

(51) Int. Cl.
*A22C 7/00* (2006.01)
*A22C 17/00* (2006.01)

(52) U.S. Cl.
CPC .......... *A22C 7/0076* (2013.01); *A22C 17/0093* (2013.01)
USPC ............. 425/145; 425/89; 425/142; 425/168; 425/297; 425/305.1; 425/328; 425/362; 425/373; 425/403.1; 425/405.1; 426/512; 426/513; 426/518

(58) Field of Classification Search
USPC .............. 425/145, 296, 297, 324.1, 335, 377, 425/574, 576, 89, 142, 305.1, 327, 328, 425/362, 373, 403.1, 405.1, 166, 168; 426/420, 496, 512, 513, 518
See application file for complete search history.

(56) References Cited

U.S. PATENT DOCUMENTS

| | | | | |
|---|---|---|---|---|
| 2,387,747 A | * | 10/1945 | Cowley | 53/454 |
| 2,490,781 A | * | 12/1949 | Cloud | 53/453 |
| 3,339,335 A | * | 9/1967 | Bowden | 53/516 |
| 3,464,299 A | * | 9/1969 | Gagnon | 83/99 |
| 3,659,519 A | | 5/1972 | MacManus | |
| 3,767,320 A | | 10/1973 | Theis et al. | |
| 3,771,938 A | * | 11/1973 | Pinto et al. | 425/174.4 |
| 3,842,536 A | | 10/1974 | Schick | |
| 3,869,757 A | | 3/1975 | Holly | |
| 3,870,013 A | | 3/1975 | Wagner | |
| 3,898,863 A | | 8/1975 | Wagner | |
| 3,926,146 A | | 12/1975 | Breyer et al. | |
| 3,939,530 A | | 2/1976 | Holly | |
| 3,952,478 A | | 4/1976 | Richards et al. | |
| 3,964,127 A | | 6/1976 | Holly | |
| 3,966,970 A | | 6/1976 | Williams | |
| 3,976,389 A | | 8/1976 | Theis, Jr. | |

(Continued)

*Primary Examiner* — Seyed Masoud Malekzadeh
(74) *Attorney, Agent, or Firm* — Wilmer Cutler Pickering Hale and Dorr LLP

(57) ABSTRACT

A cut-off device is used for providing a deposit of known portion weight of the ground meat or paste. This deposit is dropped accurately onto a conveyor belt for transport to a press wheel the height of which, from the conveyor, can be adjusted to provide a finished product of correct thickness. The press wheel has a system of vacuum ducts around the circumference in four chambers that pull paper from a denesting tray situated at the top of the press wheel, at the correct interval as to meet up with the deposit at the base of the wheel. This results in the deposit being pressed to the required thickness onto the conveyor, with the interleave paper attached to the top of the now formed patty.

15 Claims, 4 Drawing Sheets

(56) References Cited

U.S. PATENT DOCUMENTS

| | | | |
|---|---|---|---|
| 3,991,168 A * | 11/1976 | Richards et al. | 426/420 |
| 3,999,248 A * | 12/1976 | Mauer et al. | 426/513 |
| 4,054,967 A | 10/1977 | Sandberg et al. | |
| 4,097,961 A | 7/1978 | Richards | |
| 4,113,415 A | 9/1978 | Holly | |
| 4,128,164 A | 12/1978 | Sandberg | |
| 4,137,604 A * | 2/1979 | Sandberg et al. | 99/450.1 |
| 4,153,974 A | 5/1979 | Holly et al. | |
| 4,161,855 A | 7/1979 | Mulvey et al. | |
| 4,173,127 A | 11/1979 | Sandberg | |
| 4,174,945 A * | 11/1979 | Gertz | 425/501 |
| 4,182,003 A | 1/1980 | Lamartino et al. | |
| 4,187,581 A | 2/1980 | Wagner | |
| 4,203,335 A | 5/1980 | Coffey | |
| 4,233,710 A | 11/1980 | Wagner | |
| 4,236,855 A * | 12/1980 | Wagner et al. | 414/789.5 |
| 4,276,753 A | 7/1981 | Sandberg et al. | |
| 4,282,258 A * | 8/1981 | Forkner | 426/100 |
| 4,317,259 A | 3/1982 | Wagner | |
| 4,334,339 A | 6/1982 | Holly | |
| 4,343,603 A | 8/1982 | Pavlow et al. | |
| 4,343,755 A | 8/1982 | Miller et al. | |
| 4,349,575 A * | 9/1982 | Roth | 426/513 |
| 4,356,595 A | 11/1982 | Sandberg et al. | |
| 4,369,885 A * | 1/1983 | Redmond | 206/484 |
| 4,372,008 A | 2/1983 | Sandberg | |
| 4,395,427 A | 7/1983 | Fischer et al. | |
| 4,417,434 A | 11/1983 | Piereder | |
| 4,418,446 A | 12/1983 | Sandberg et al. | |
| 4,428,263 A | 1/1984 | Lindee et al. | |
| 4,449,350 A * | 5/1984 | Sanford | 53/412 |
| 4,498,784 A | 2/1985 | Bernhardsson et al. | |
| 4,516,291 A * | 5/1985 | Goldberger et al. | 426/513 |
| 4,549,458 A | 10/1985 | Townsend | |
| 4,565,054 A | 1/1986 | Piereder | |
| 4,642,849 A | 2/1987 | Piereder | |
| 4,651,498 A | 3/1987 | Piereder | |
| 4,710,117 A * | 12/1987 | Haas et al. | 425/126.1 |
| 4,736,896 A | 4/1988 | Wagner | |
| 4,768,260 A | 9/1988 | Sandberg | |
| 4,768,325 A | 9/1988 | Lindee et al. | |
| 4,797,291 A * | 1/1989 | Pierce et al. | 426/63 |
| 4,830,230 A | 5/1989 | Powers | |
| 4,843,799 A * | 7/1989 | Simelunas et al. | 53/448 |
| 4,871,410 A | 10/1989 | Bonnebat et al. | |
| 4,874,456 A * | 10/1989 | Takagi | 156/471 |
| 4,928,591 A | 5/1990 | Lindee | |
| D312,193 S | 11/1990 | Cooper | |
| 4,975,039 A * | 12/1990 | Dare et al. | 425/238 |
| 5,029,735 A | 7/1991 | Dennis et al. | |
| 5,034,801 A | 7/1991 | Fischer | |
| 5,035,671 A | 7/1991 | Anderson et al. | |
| 5,045,148 A * | 9/1991 | Hoffstetter et al. | 156/567 |
| 5,060,562 A | 10/1991 | Florindez | |
| 5,071,326 A | 12/1991 | Wright et al. | |
| 5,073,391 A | 12/1991 | DeMars et al. | |
| 5,081,819 A * | 1/1992 | Cloud | 53/453 |
| 5,182,120 A * | 1/1993 | Kusters et al. | 425/238 |
| 5,241,898 A | 9/1993 | Newnan | |
| 5,366,685 A * | 11/1994 | Fujii et al. | 264/547 |
| 5,391,386 A * | 2/1995 | Mally | 426/420 |
| 5,405,663 A | 4/1995 | Archibald et al. | |
| D361,480 S | 8/1995 | Cooper | |
| 5,476,035 A | 12/1995 | Florindez | |
| 5,517,904 A | 5/1996 | Vargas et al. | |
| RE35,297 E | 7/1996 | Anderson et al. | |
| D371,283 S | 7/1996 | Cooper | |
| 5,542,342 A | 8/1996 | McNeill et al. | |
| 5,544,572 A | 8/1996 | Garmendia | |
| 5,620,728 A | 4/1997 | Langley et al. | |
| 5,691,399 A | 11/1997 | Koblitz et al. | |
| 5,732,447 A | 3/1998 | Nolen et al. | |
| 5,756,138 A * | 5/1998 | Milohanic | 426/231 |
| 5,759,602 A | 6/1998 | Kobussen et al. | |
| 5,809,745 A * | 9/1998 | Reinert | 53/447 |
| 6,001,402 A | 12/1999 | Dupont | |
| 6,056,634 A | 5/2000 | Schwarz et al. | |
| 6,065,392 A | 5/2000 | Florindez | |
| 6,152,194 A | 11/2000 | Tenkanen et al. | |
| 6,269,850 B1 | 8/2001 | Price et al. | |
| 6,331,104 B1 | 12/2001 | Kobussen et al. | |
| 6,374,873 B1 | 4/2002 | Price et al. | |
| 6,403,135 B1 * | 6/2002 | Graham et al. | 426/389 |
| 6,413,073 B2 | 7/2002 | McFarland | |
| 6,416,314 B1 | 7/2002 | LaBruno | |
| 6,428,303 B2 | 8/2002 | Lindee et al. | |
| 6,454,622 B2 | 9/2002 | Mashiko et al. | |
| 6,479,087 B1 | 11/2002 | Cole et al. | |
| 7,159,372 B2 * | 1/2007 | Lindee et al. | 53/157 |
| 7,182,008 B2 * | 2/2007 | Negishi et al. | 83/15 |
| 7,677,880 B2 * | 3/2010 | Moore et al. | 425/324.1 |
| 2003/0008068 A1 * | 1/2003 | Josephy et al. | 427/255.6 |
| 2005/0112228 A1 * | 5/2005 | Smith et al. | 425/388 |
| 2005/0230875 A1 | 10/2005 | Miller et al. | |
| 2006/0017189 A1 | 1/2006 | Miller | |

* cited by examiner

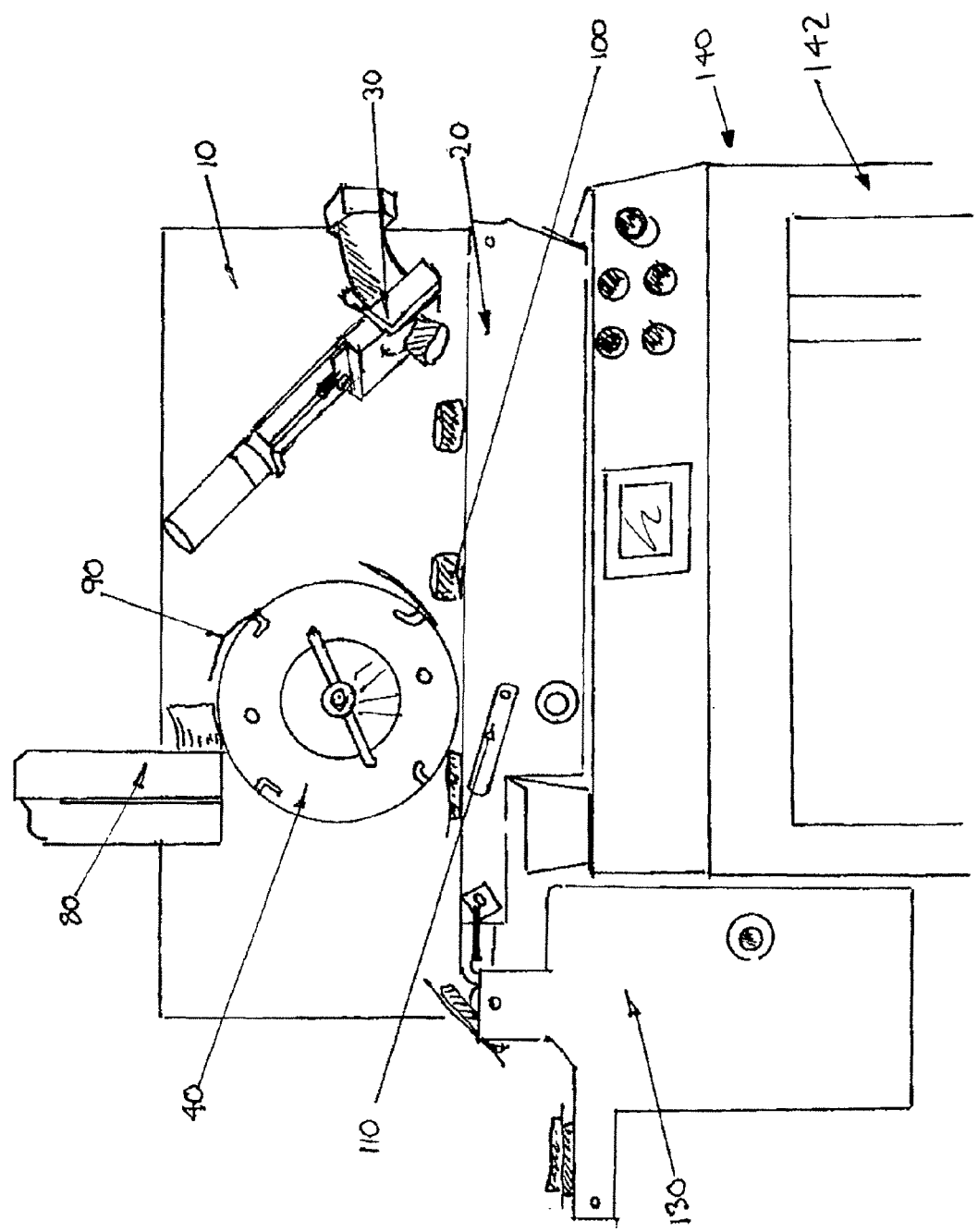

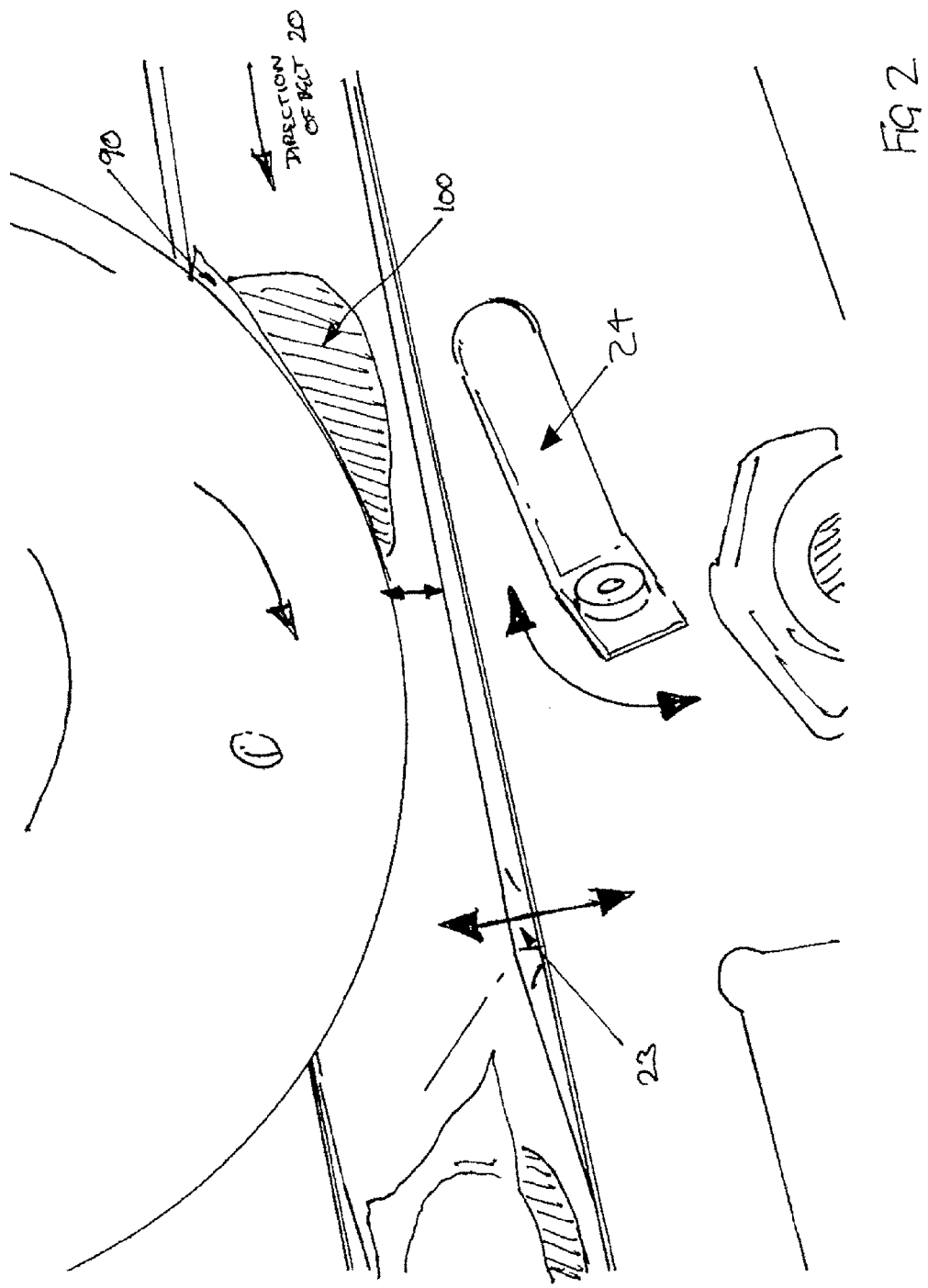

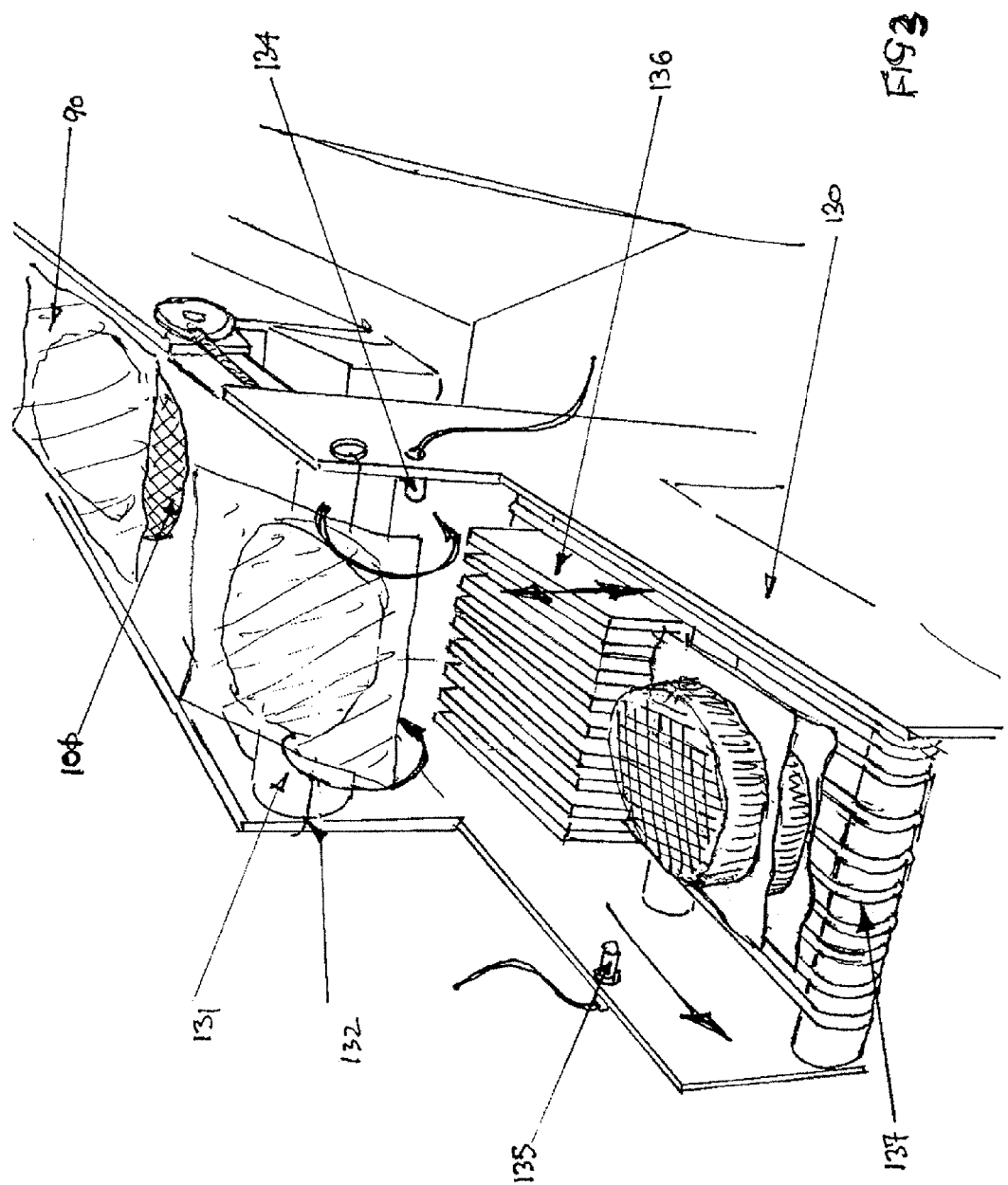

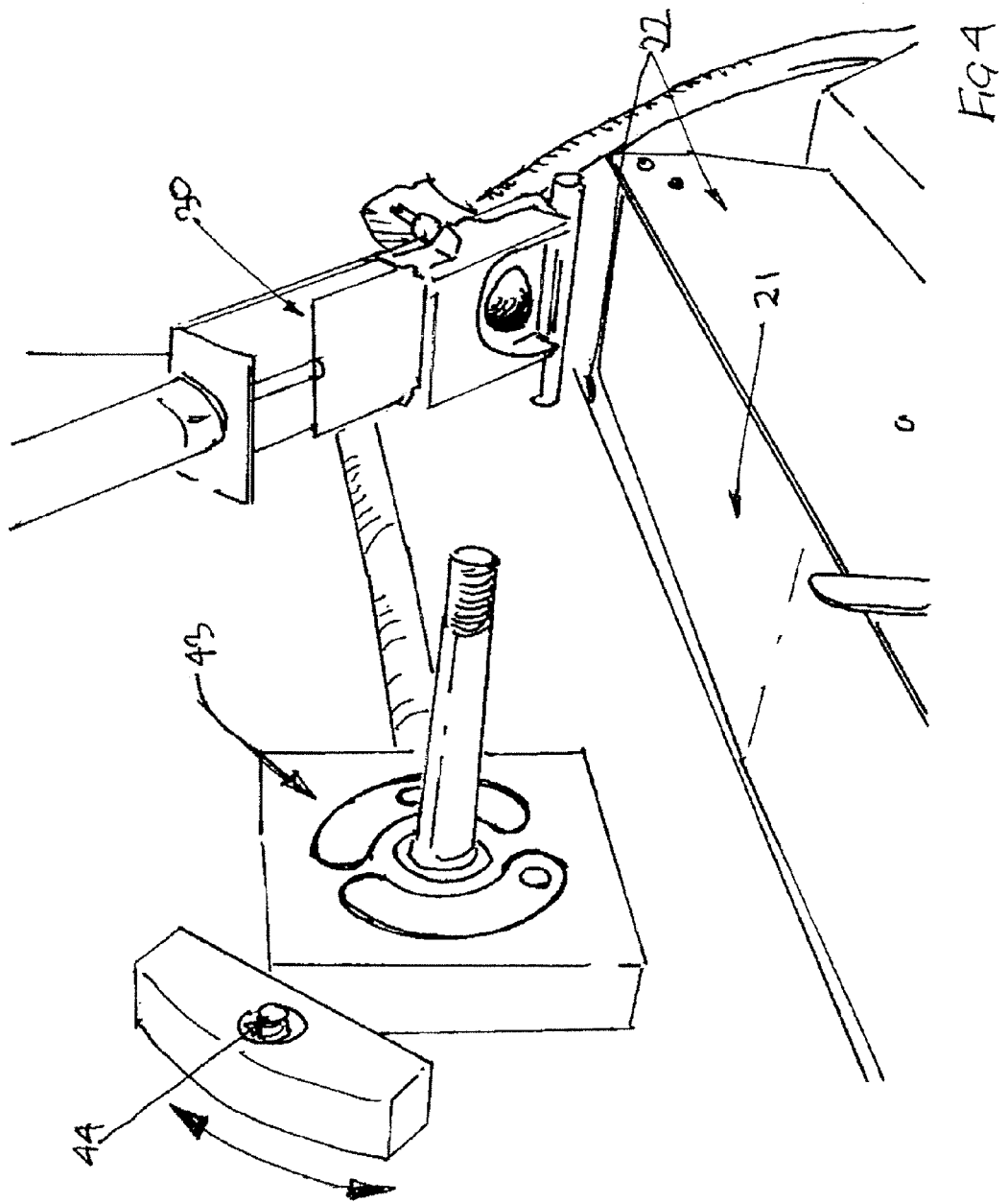

MACHINE FOR THE PRODUCTION OF FORMED PATTIES WITH A HAND MADE APPEARANCE, AND METHOD FOR INTERLEAVING PAPER AND STACKING

CROSS-REFERENCE TO RELATED APPLICATION

This application claims priority under 35 U.S.C. Section 119(e) from provisional application Ser. No. 60/947,286, filed Jun. 29, 2007, which is expressly incorporated by reference.

FIELD OF THE INVENTION

The present invention relates generally to the field of food processing, and more particularly to the field of meat patty processing.

BACKGROUND OF THE INVENTION

In the processing of meat patties (hamburgers), ground meat or a similar paste is formed into various shapes, but more commonly a round, flat patty for cooking and placement in a bun.

In one known process, the patties are formed by pressing the meat into a mold plate and ejected using a knock out. This method produces a patty of known volume and weight, but one with a sharp mechanically produced look. Paper is interleaved between the patties to stop the patties from sticking together when stacked.

SUMMARY OF THE INVENTION

It can be appreciated that an automated system for the production, paper interleaving, and stacking of patties with a hand made appearance is desirable. However, the design of such an apparatus must take into consideration space, efficiency, and simplicity.

In embodiments described here, a cut-off device is used for providing a deposit of known portion weight of the ground meat or paste. This deposit is dropped accurately onto a conveyor belt for transport to a press wheel the height of which, from the conveyor, can be adjusted to provide a finished product of correct thickness. The press wheel has been provided with a system of vacuum ducts around the circumference in four chambers that pull paper from a de-nesting tray situated at the top of the press wheel, at the correct interval as to meet up with the deposit at the base of the wheel. This results in the deposit being pressed to the required thickness onto the conveyor, with the interleave paper attached to the top of the now formed patty.

The embodiments described here also allow for stacking of the patty with paper attached. A problem that exists is that a patty is now stuck upside down to the conveyor with paper on top. The patty now needs to be separated from the conveyor and flipped before it can be stacked. This is achieved by a roller and wire located at the end of the conveyor, whereupon the patty is separated from the conveyor. Flipping is achieved by a simple drop onto a secondary belt as the method of separating the patty from the belt as described above, results in a flipping action of the product, and depending on the height of the second belt, the patty lands upright with the paper at the bottom. Taking this example to the next level, by making this second belt vary in height from the first, patties can be stacked such as in groups of one to six patties with paper interleaving.

BRIEF DESCRIPTION OF THE DRAWINGS

FIG. 1 is a front view of a machine for the production of patties with a hand made appearance.

FIG. 2 is a close up of the device used to set the patty thickness.

FIG. 3 is a view of the patty flipper and stacking device.

FIG. 4 is a view of the vacuum manifold.

NUMBERED LIST 10 is a machine for the production of patties with a hand made appearance, with paper interleaving and stacking.
20 is a feed conveyor.
30 is a cut-off device.
40 is a vacuumized press wheel.
80 is a paper de-nesting tray.
90 is a piece of patty paper.
100 is a deposit of ground meat, meat paste, or similar.
130 is a stacking belt.

DETAILED DESCRIPTION

An apparatus 10 for the production of patties with hand made appearance, paper interleaving, and stacking is illustrated in FIGS. 1 to 4. The apparatus 10 generally includes a rolling base 140 having a central support member, four supporting legs 142, and four braked casters (not shown). The central support member is also utilized to mount the vacuum pump. The apparatus 10 further includes a safety guard, and a frame box that encases the drive system and electrical components. Mounted to the rear of the apparatus is a cut-off device 30, below which sits the in-feed conveyor 20. The cut-off device could be pneumatic, servo, or any other known mechanism which facilitates providing the deposit of the food for the patty at the appropriate time. The conveyor consists of a belt 21 and two sides 22 (FIG. 4) mounted to the frame box. Under the belt 21 is an adjustable lift plate 23 that changes in the distance between the belt 21 and a press wheel 40, using lever 24. This allows the thickness of the finished patty to be adjusted.

The apparatus 10 further includes a vacuumized press wheel 40. Within the press wheel 40 are vacuum chambers and vacuum ducts and slip ring 43 that allows suction from the vacuum pump to be delivered to the individual chambers and form the vacuum ducts of the press wheel 40 in order to suck and pull the patty paper 90 from the paper de-nesting tray 80 as the wheel 40 is rotated.

The apparatus 10 further includes a free turning roller 131 and wire 132 to separate the deposit 100 with paper 90, from the feed conveyor 20. This is located above the stacking belt 130, consisting of an o-ring belt 137 and stacking tray 136 that is adjusted for height by actuator. A sensor 134 is utilized to trigger the stacking tray 136 so that the patties stack correctly. A second sensor 135 is located at the exit of the o-ring belt 137 to ensure the stack is clear of the stacking tray 136, so the stacking cycle can re-start.

In operation, a deposit 100 is dropped onto the feed conveyor 20 by the cut-off device 30. The deposit is triggered by a sensor 44 located at the rear of the press wheel 40. The sensor 44 is adjustable so that the deposit 100 is synchronized to the patty paper 90 as it comes round on the press wheel 40. As the press wheel 40 rotates, the patty paper 90 sheets are continually pulled from the paper de-nest tray 80 while the sensor 44 continues to trigger the cut-off device 30. This ensures that a continuous stream of finished patties 101 are coming through the press wheel 40. The synchronization of paper and deposit could be achieved by using a servo drive on the wheel or conveyor. Then a sensor could detect the deposit and bring them together using simple closed loop technology.

The thickness of the finished patty 101 is determined by the height set on the lift plate 23. The patties with paper 101 arrive at the end of the feed conveyor 20 and slide over the top of the roller 131 where a wire 132 separates the patty with paper 101 from the surface of the roller 110 allowing the finished patty 101 to fall and flip so the paper 90 is now at the bottom of the finished patty 101. Situated below the roller 110 is the stacking tray 136 lifted up between the o-ring belt 137. The released patty with paper 101 now lands on the stacking tray 136, and the stacking tray 136 drops closer to the o-ring belt 137 as the actuator is triggered by the sensor 134. When the required stack of patties is obtained, the stacking tray 136 drops below the height of the o-ring belt 137 so that the stack is automatically taken away from the base of the roller 110, and feed belt 20, the second sensor 135 sees that the stack has cleared the stacking tray 136 before triggering the actuator to lift the stacking tray 136 back up to receive the next stack of finished patties 101.

The foregoing description of the present invention has been presented for purposes of illustration and description. Furthermore, the description is not intended to limit the invention to the form disclosed herein. Consequently, variations and modifications commensurate with the above teachings and the skill and knowledge of the relevant art are within the scope of the present invention. The embodiments described herein are further intended to explain best modes known for practicing the invention and enable others skilled in the art to utilize the invention in such or other embodiments and with various modifications required by the particular applications or uses of the present invention. It is intended that the appended claims be construed to include alternative embodiments to the extent permitted by the prior art.

The invention claimed is:

1. An apparatus for producing patties from a food product, said apparatus comprising:
    a conveyor configured to move along a first direction from a feed location to an output location;
    a cut-off device configured to provide portioned deposits onto the conveyor, wherein the deposits each includes a food product;
    a container configured to hold a plurality of sheets of paper;
    a press wheel, mounted over the conveyor and spaced at a predetermined distance from the conveyor, wherein the press wheel is rotatable and configured to press one of the plurality of deposits to form a plurality of patties of the food product on the conveyor, the patties having a thickness based on the predetermined distance, wherein the press wheel is further configured to receive a sheet of paper from the container and to provide the sheet of paper onto one of the plurality patties; and
    a sensor system configured to synchronize an operation of the cut-off device and the press wheel such that as the press wheel rotates to form a plurality of patties on the conveyor one sheet of paper is provided to each of the plurality of patties while the sensor system continues to trigger the cut-off device, wherein the press wheel is configured to press one of the plurality of deposits and provide the sheet of paper onto one of the plurality of patties simultaneously.

2. The apparatus of claim 1, further comprising a roller and wire to flip one of the plurality of patties by 180 degrees after the one of the plurality of patties has been formed with the sheet of paper on top, such that the one of the plurality of patties is thereafter on top of the sheet of paper.

3. The apparatus of claim 2, further comprising a stacking tray configured to receive at least one of the plurality of flipped patties.

4. The apparatus of claim 3, wherein the stacking tray is configured to receive the at least one of the plurality of flipped patties until a number of patties in the stacking tray exceeds a predetermined number.

5. The apparatus of claim 3, wherein the stacking tray is configured to receive the at least one of the plurality of flipped patties until a total height of patties in the stacking tray exceeds a predetermined height.

6. The apparatus of claim 1, wherein the conveyor is configured to move at a circumferential speed of the press wheel, thus ensuring that each of the plurality of patties is moving at a substantially same speed as the circumferential speed of the press wheel.

7. The apparatus of claim 1, wherein the sensor system includes a servo drive placed on one of the press wheel or the conveyor.

8. The apparatus of claim 1, further comprising a lift plate configured to control a thickness of the one of the plurality of patties.

9. The apparatus of claim 1, wherein the press wheel includes means for holding sheets of paper to the press wheel as the press wheel is rotated.

10. The apparatus of claim 3, wherein the sensor system is further configured to trigger the stacking tray to stack the plurality of patties.

11. An apparatus comprising:
    a conveyor configured to move along a first direction;
    a cut-off device configured to provide a deposit onto the conveyor;
    a sensor system configured to trigger the cut-off device to provide the deposit onto the conveyor; and
    a press wheel, spaced at a predetermined distance from the conveyor, configured to press the deposit to form a patty, having a predetermined thickness based on the predetermined distance, on the conveyor, wherein the press wheel is further configured to receive a sheet of paper from a container and to provide the sheet of paper over a top of the patty such that as the press wheel rotates, the sheet of paper is provided for the press wheel while the sensor system triggers the cut-off device, wherein the press wheel is configured to press the deposit and provide the sheet of paper onto the patty simultaneously.

12. The apparatus of claim 1, wherein the press wheel is configured to receive the sheet of paper from the container using a vacuum system coupled to the press wheel.

13. The apparatus of claim 12, wherein the vacuum system is configured to pull sheets of paper from the container one at a time and to place the sheet of paper onto the press wheel.

14. The apparatus of claim 12, wherein the vacuum system includes a plurality of ducts around its circumference, and wherein the ducts are configured to couple to the vacuum system to hold the sheet of paper as the press wheel is rotated.

15. The apparatus of claim 12, wherein the sensor system is configured to synchronize the cut-off device and the vacuum system.

* * * * *